June 17, 1969  W. R. EDWARDS  3,451,060
CORNER REFLECTOR

Filed June 30, 1965   Sheet 1 of 4

INVENTOR
WILLIAM R. EDWARDS

Claude Funkhouser
ATTORNEY

BY Stanley N. Garber
AGENT

June 17, 1969 W. R. EDWARDS 3,451,060
CORNER REFLECTOR

Filed June 30, 1965 Sheet 2 of 4

June 17, 1969 W. R. EDWARDS 3,451,060
CORNER REFLECTOR
Filed June 30, 1965 Sheet 4 of 4
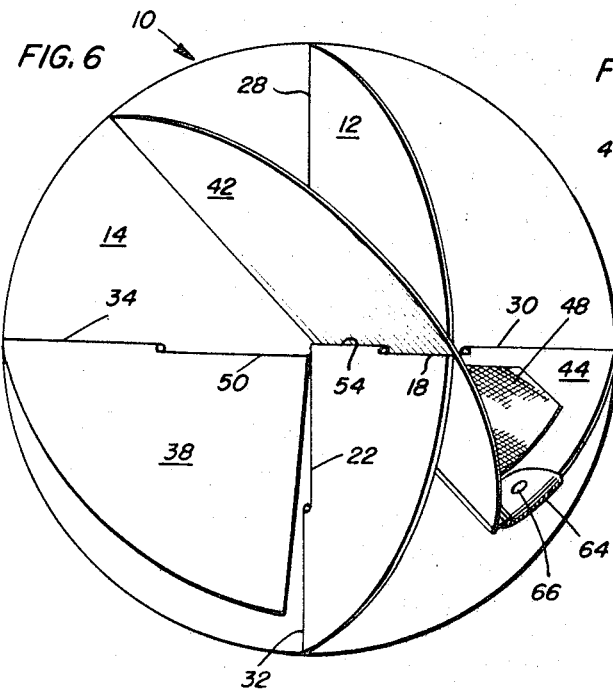
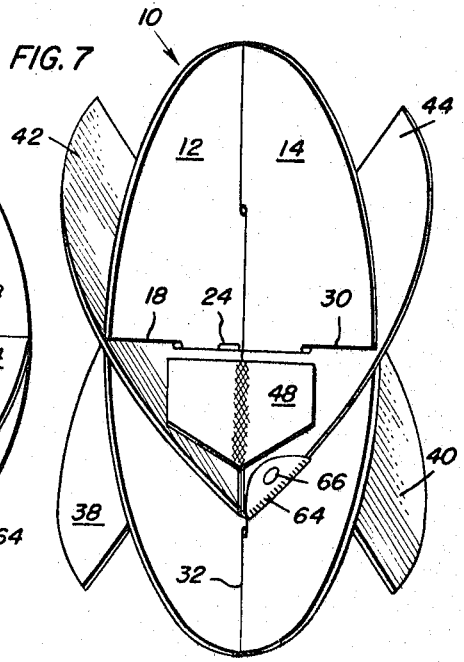
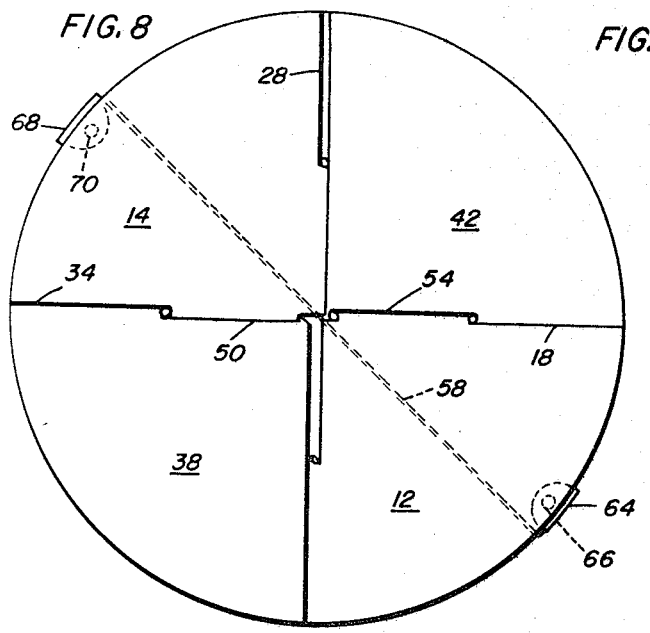
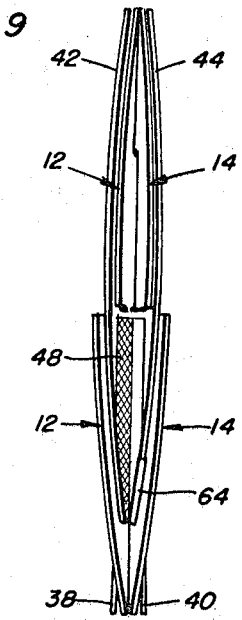

United States Patent Office 3,451,060
Patented June 17, 1969

3,451,060
CORNER REFLECTOR
William R. Edwards, California, Md., assignor to the United States of America as represented by the Secretary of the Navy
Filed June 30, 1965, Ser. No. 468,677
Int. Cl. H01q *15/18*
U.S. Cl. 343—18          4 Claims The invention described herein may be manufactured and used by or for the Government of the United States of America without the payment of any royalties thereon or therefor.

The present invention relates to radar reflectors and more particularly to an eight-corner radar reflector which is capable of being folded flat but which automatically opens into an extended position when unrestrained.

Collapsible or foldable radar reflectors are well-known in the prior art. Such devices generally comprise three plane reflective surfaces set mutally perpendicular to each other and intersecting at a common center so as to present a series of trihedral reflector cavities each of equilateral inverted pyramid form. In such devices there are generally eight outwardly diverging trihedral reflector cavities with their axes radiating in all directions from the common center thereof. Such reflectors will reflect back along a path parallel to their incident path, waves striking any of their surfaces from any direction. In other words, because of the relationship between the angles of incidence and reflection of a radar beam intersecting the target at any point within its total volume, there will always be at least one of the beams reflected back to its source.

It is highly desirable that such radar reflectors be capable of being folded into a relatively flat configuration so that a large number thereof may be stowed in a relatively small volume. Of course, prior to or during deployment, such radar reflectors must be capable of being unfolded and opened into an extended position so that they may properly function to reflect radar waves propagated thereagainst.

In the past, such radar reflectors have generally been openable only by the application of an external force, such as is illustrated in U.S. Patents Nos. 2,885,670 and 2,912,687 wherein a wire or cord harness attached at selected points on the radar reflector may be pulled or held by an operator to thereby open the reflector. Though this method of opening such reflectors has proven satisfactory when only a small number thereof are to be deployed, it obviously could not be utilized when either a large number are to be deployed or when the reflectors are inaccessible to the manipulations of an operator. Such conditions exist, for example, when radar reflectors of the type described are to be dispensed in large quantities from either an aircraft or a missile.

The general purpose of the present invention, therefore, is to provide a foldable radar reflector which embraces all of the advantages of similarly employed reflectors but which possesses none of the aforedescribed disadvantages. To attain this, the present invention utilizes a unique self-opening mechanism which automatically opens the radar reflector into an extended position when the reflector is unrestrained.

Accordingly, an object of the present invention is the provision of a foldable radar reflector.

Another object of the present invention is to provide a foldable radar reflector which automatically opens into an extended position when unrestrained.

A further object of the present invention is the provision of a radar reflector which can be folded flat so as to occupy a small volume, thereby permitting a large number thereof to be dispensed when desired.

Still another object of the present invention is to provide a foldable radar reflector incorporating unique opening means.

Yet another object of the present invention is the provision of a radar reflector which is characterized by simplicity of construction, low cost and ease of operation and use.

Other objects, advantages and novel features of the present invention will become apparent from the following detailed description of the invention when considered in conjunction with the accompaying drawings wherein:

FIG. 6 is a plan view of the radar reflector in a still further closed position;

FIG. 7 is a wide elevation of the radar reflector as shown in FIG. 6;

FIG. 8 is a plan view of the radar reflector in its fully closed position; and

FIG. 9 is a side elevation view of the radar reflector as shown in FIG. 8.

Figure 1:
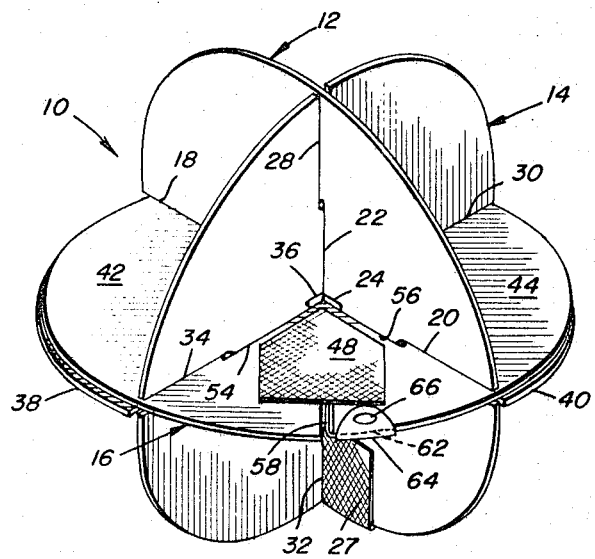
FIG. 1 is a perspective view of the radar reflector of the present invention in its fully opened position.
Figure 2:
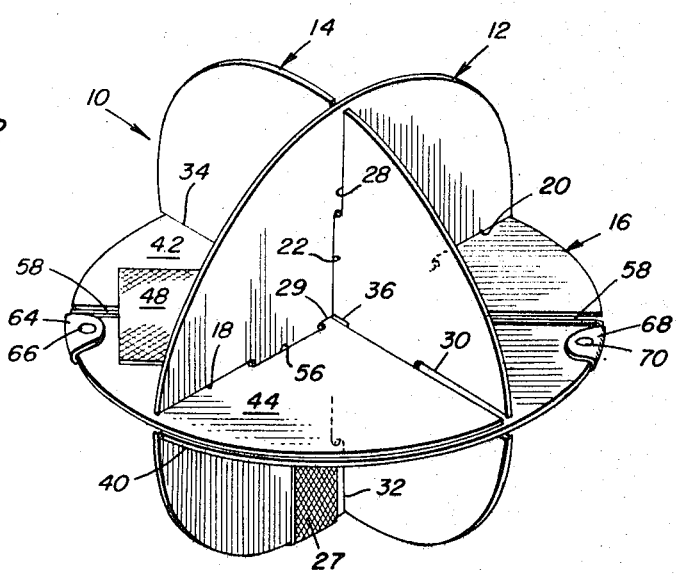
FIG. 2 is a perspective view similar to FIG. 1 but rotated 90° clockwise about a vertical axis.

Referring now to the drawings wherein like reference characters designate like or corresponding parts throughout the several views, there is shown in FIGS. 1 and 2, a radar reflector, generally indicated by reference character 10, comprised of three mutually perpendicular circular discs 12, 14 and 16, having equal diameters and a common center. As thus configured, the discs 12, 14 and 16 define eight corner reflectors having coincident inner apices, each of the corner reflectors being formed by the intersection of three mutually perpendicular quadrants.

Figure 3:
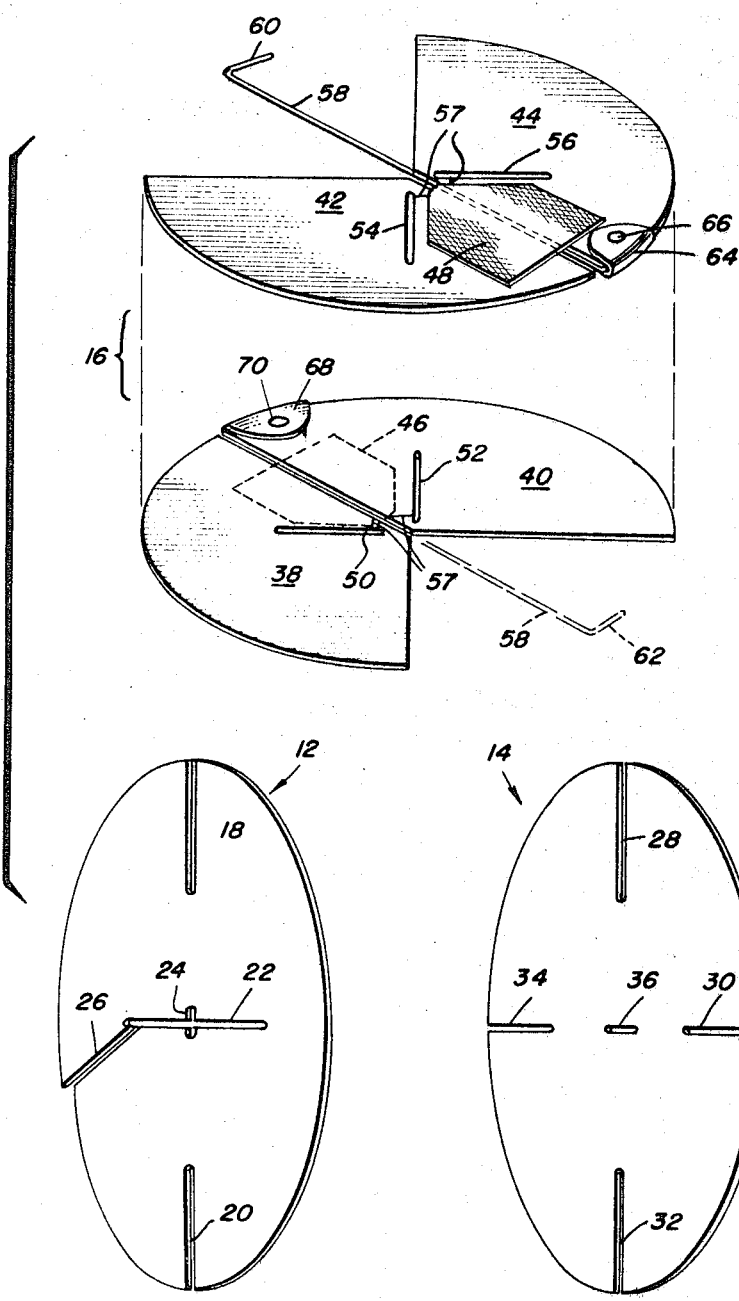
FIG. 3 is an exploded perspective view of the invention.
Figure 4:
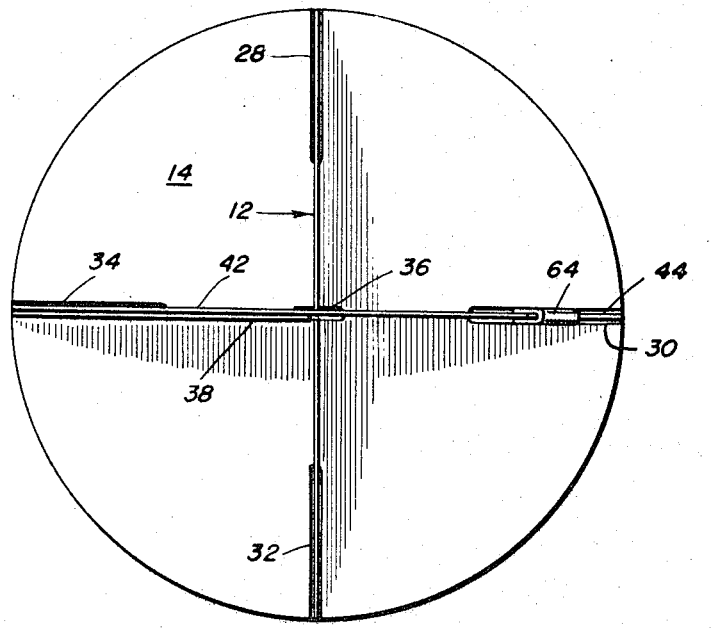
FIG. 4 is a plan view of the radar reflector in its opened positioned.
Figure 5:
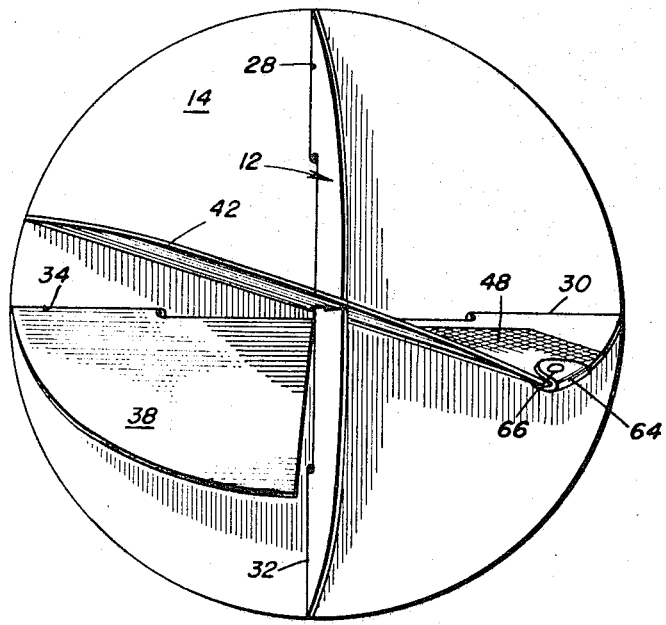
FIG. 5 is a plan view of the radar reflector in a partially closed position.

The individual components of the radar reflector 10, as illustrated in FIG. 3, comprise a pair of unitary discs 12 and 14 and a composite disc 16, each of which is formed of a radar reflective material such as sheet aluminum or magnesium or of a plastic material coated by conventional techniques with a radar reflective material.

The circular unitary disc 12 is provided with a pair of peripherally extending diametrically opposed slots 18 and 20, each of which is of a length approximately equal to one-half of the radius of the disc 12. A pair of mutually perpendicular slots 22 and 24 are provided in the center of the disc 12 with an assembly slit 26 connecting slot 22 with the periphery of the disc 12. The slit 26 may be covered with a piece of cloth or tape 27 after the reflector 10 has been assembled.

The unitary circular disc 14 is provided with four radially extending slots 28, 30, 32 and 34 spaced at 90° intervals around the periphery of the disc with each slot having a length approximately equal to one-half of the radius of the disc. In addition, a central slot 36 is provided along the diagonal formed by slots 30 and 34.

The composite disc 16 is formed of four 135° sectors 38, 40, 42 and 44. The sectors 38 and 40 are secured together by a cloth hinge 46, while the sectors 42 and 44 are secured together by a cloth hinge 48. It should be understood, of course, that any type of hinges, such as conventional metal hinges, may be utilized in place of the cloth hinges 46 and 48. In addition, the sectors 38, 40, 42 and 44 are provided with radially extending slots 50, 52, 54 and 56, respectively, each being provided with an assembly slit 57. A spring steel torsion bar 58 having end portions 60 and 62 at right angles thereto is secured to the upper pair of sectors 42, 44 by means of a metal tab 64 folded over and riveted as at 66 and to the lower pair of sectors 38 and 40 by means of a similar tab 68 and rivet 70. Thus, when the upper and lower pairs of sectors are in a flat assembled position, the torsion bar 58 is in a relaxed or untwisted state but when each sector of each of the respective pairs of sectors are folded together, so that the disc 16 takes the configuration of a pair of equiangular sectors with the angular displacement between the two sectors arranged such that the magnitude of the angles of the two unoccupied sectors are equal, the torsion bar 58 is twisted and thereby placed in a loaded or biased state.

The radar reflector 10 is assembled by inserting the unitary disc 14 onto the unitary disc 12 through the assembly slit 26 until the slot 36 of the disc 14 is received in the slot 22 and is perpendicular to the slot 24 of the disc 12. The four sectors 38, 40, 42 and 44 of the composite disc 16 are then assembled, in the position indicated in FIG. 3, onto the discs 12 and 14 through their respective assembly slits 57. The torsion bar 58 is then secured to the sector 40 with the tab 68 and rivet 70 and to the sector 44 with the tab 64 and rivet 66 and then the upper and lower pairs of sectors 42, 44 and 38, 40 are respectively secured together with the hinges 48 and 46. To complete the assembly, the assembly slit 26 may be covered with a piece of material or tape 27 so as to prevent inadvertent disassembly of the reflector.

In folding the radar reflector 10 from its open to its closed position, the operator merely separates the overlapping sectors of disc 16 until the two sectors in each of the sector pairs are in an abutting, substantially parallel relationship to one another. As shown in sequence in FIGS. 4 through 9, the sectors 38 and 42 are separated and folded downwardly in opposite directions until they are substantially parallel to the unitary disc 14. Since the sectors 40 and 44 are connected to the sectors 38 and 42 by the hinge means 46 and 48, respectively, the sectors 40 and 44 are also caused to separate until they abut against and are substantially parallel to the opposite side of the unitary disc 14. As the four sectors 38, 40, 42 and 44 of the composite disc 16 are folded, they cam the unitary disc 12 downwardly until it too is in an abutting substantially parallel relationship with the unitary disc 14. In addition, the folding of the segments 40 and 44 of the composite disc 16 twists the torsion bar 58 into the position illustrated in phantom in FIG. 8, thereby torsionally loading the bar.

The folded radar reflector 10, as illustrated in FIGS. 8 and 9, occupies a relatively small volume and, therefore, may be stowed in large quantities in a cylindrical canister until it is desired to utilize them, whereupon the end of the canister may be removed and the reflectors forced out of the open end either manually or by any conventional ejector. When the radar reflectors have separated and are, therefore, unrestrained, they will automatically open into their extended position without the assistance of harness assemblies or other external opening means.

As is apparent, unfolding of the reflector 10 is caused by the torsion bar 58 untwisting from its loaded state. As the torsion bar 58 untwists, it causes sectors 40 and 44 to which it is attached to unfold, thereby causing sectors 38 and 42 along with the unitary disc 12 to unfold and separate from the unitary disc 14 in the same manner, but opposite directions, as hereinbefore set forth when folding the reflector.

Thus, there has been described an eight corner radar reflector comprised of three mutually perpendicular discs having equal diameters and a common center, which reflector can be folded into a flat position but which opens into its extended position when unrestrained without the assistance of any external opening means.

Obviously many modifications and variations of the present invention are possible in the light of the above teachings. It is therefore to be understood that within the scope of the appended claims the invention may be practiced otherwise than as specifically described.

What is claimed is:
1. A foldable radar reflector comprising
   first, second and third discs hingedly secured together along their diameters, each of said discs having radar reflective surfaces, said reflector having an extended position wherein said discs are set mutually perpendicular to one another so as to define eight corner reflectors having coincident inner apices and a folded position wherein said discs are superimposed in substantially parallel relationship; and
   wherein said third disc comprises four 135° C. sectors pivotally secured together in pairs along a common radius so as to define two 270° sectors, said 270° sectors normally being disposed in a superimposed substantially parallel relationship to one another; and
   spring means comprising torsion bar means for automatically opening said reflector into its extended position when unrestrained, said torsion bar means being secured to and disposed along the diameter of said third disc.
2. A foldable radar reflector in accordance with claim 1 wherein said spring means further comprises hinge means for hinging one end of said torsion bar to one of said 270° sectors and the other end of said torsion bar to the other 270° sector.
3. A foldable radar reflector in accordance with claim 2 wherein said first and second disc are each formed of a unitary construction.
4. A foldable radar reflector comprising
   a plurality of radar reflective discs so configured and arranged as to define a plurality of corner reflectors when in an open position wherein said plurality of discs comprises three discs hinged together along their diameters, said disc having a common center, whereby said reflector may be folded to a closed position wherein said discs are superimposed in substantially parallel relationship to one another and may be unfolded to an open position so as to define eight corner reflectors having coincident inner apices;
   wherein the first disc of said three discs comprises a unitary disc having a pair of diametrically opposed radially extending slots therein and a pair of mutually perpendicular radial slots intersecting at the center of said first disc and the second disc of said three discs comprises;
   a unitary disc having four radially extending slots spaced at 90° intervals around the periphery thereof and a central slot intersecting the center of said disc and wherein the third disc of said three discs comprises a composite disc having four 135° sectors pivotally secured together in pairs along a common radius so as to define two 270° sectors with each of said 135° sectors having a radially extending slot therein and said 270° sectors normally being disposed in a superimposed substantially parallel relationship to one another; and
   resilient means normally urging said discs into said open position, said resilient means comprising torsion bar means and hinge means for attaching one end of torsion bar to one pair of sectors of said disc arranged in sectors and the other end of said torsion bar to a different pair of sectors of said disc arranged in sectors.

References Cited

UNITED STATES PATENTS 1,635,915  7/1927  White _____ 343—18 X
3,152,329  10/1964  Lowery et al. _____ 343—18

FOREIGN PATENTS 586,904  4/1947  Great Britain.
658,915  10/1951  Great Britain.

RICHARD A. FARLEY, *Primary Examiner.*

JEFFREY P. MORRIS, *Assistant Examiner.*